(12) United States Patent
Liebner

(10) Patent No.: US 9,713,759 B2
(45) Date of Patent: Jul. 25, 2017

(54) SKI POLE ACCESSORIES

(71) Applicant: Andrew D. Liebner, Cheboygan, MI (US)

(72) Inventor: Andrew D. Liebner, Cheboygan, MI (US)

(*) Notice: Subject to any disclaimer, the term of this patent is extended or adjusted under 35 U.S.C. 154(b) by 0 days.

(21) Appl. No.: 15/012,546

(22) Filed: Feb. 1, 2016

(65) Prior Publication Data

US 2016/0220890 A1 Aug. 4, 2016

Related U.S. Application Data

(60) Provisional application No. 62/125,801, filed on Feb. 2, 2015.

(51) Int. Cl.
| | | |
|---|---|---|
| *A63C 11/22* | (2006.01) | |
| *F16B 2/10* | (2006.01) | |
| *F16B 2/00* | (2006.01) | |
| *A63C 11/24* | (2006.01) | |

(52) U.S. Cl.
CPC .......... *A63C 11/227* (2013.01); *A63C 11/221* (2013.01); *A63C 11/222* (2013.01); *A63C 11/24* (2013.01); *F16B 2/005* (2013.01); *F16B 2/10* (2013.01)

(58) Field of Classification Search
CPC ... A63C 11/221; A63C 11/222; A63C 11/227; A63C 11/228; A63C 11/24; A45B 2009/007; A45B 9/04
See application file for complete search history.

(56) References Cited

U.S. PATENT DOCUMENTS

| | | | |
|---|---|---|---|
| 3,880,443 A | | 4/1975 | Tobin |
| 4,391,456 A | | 7/1983 | Moor |
| D278,649 S | | 4/1985 | Nordgren et al. |
| D279,026 S | | 5/1985 | Nordgren et al. |
| 4,641,857 A | | 2/1987 | Gailiunas |
| 4,669,752 A | * | 6/1987 | Jackson ................. A63C 11/24 280/824 |
| 4,750,760 A | | 6/1988 | Gurley |
| 5,123,674 A | | 6/1992 | Bagneres et al. |

(Continued)

FOREIGN PATENT DOCUMENTS

| | | |
|---|---|---|
| EP | 0184950 | 11/1985 |
| EP | 0276523 | 8/1988 |

(Continued)

*Primary Examiner* — Brian Swenson
(74) *Attorney, Agent, or Firm* — Brooks, Cameron & Huebsch, PLLC

(57) ABSTRACT

Ski pole accessories are described herein. Ski pole accessories can include a releasable ski pole basket system, a ski pole clamp system, and a releasable ski pole strap system. A ski pole basket system can include a ski pole ferrule and a ski pole basket having a slot therethrough that receives and secures the ski pole ferrule. A ski pole clamp system can include a rubber mold with a first and a second thickness to secure the ski pole clamp to an upper component and a lower component of a ski pole. A releasable ski pole strap system can include a pole mount including a jaw that engages a strap attachment member, where operation of the jaw disengages the strap attachment member from the ski pole mount.

20 Claims, 10 Drawing Sheets

(56) References Cited

U.S. PATENT DOCUMENTS

| | | | |
|---|---|---|---|
| 5,326,134 A * | 7/1994 | Hiser | A63C 11/222 24/17 AP |
| 5,441,307 A * | 8/1995 | Quintana | A63C 11/221 24/270 |
| 5,470,108 A | 11/1995 | Goode et al. | |
| 6,631,927 B1 | 10/2003 | Vold | |
| 7,322,612 B2 | 1/2008 | Trinen et al. | |
| 7,770,931 B2 | 8/2010 | Lenhart | |
| 8,678,020 B2 | 3/2014 | Renaud-Goud et al. | |
| 2006/0143867 A1 * | 7/2006 | Wu | A63C 11/222 16/436 |
| 2007/0108756 A1 * | 5/2007 | Laakso | A63C 11/221 280/823 |
| 2009/0194986 A1 | 8/2009 | Lenhart | |
| 2010/0170547 A1 * | 7/2010 | Pietrzak | A45B 9/00 135/75 |
| 2010/0218347 A1 | 9/2010 | Lenhart | |
| 2011/0084472 A1 * | 4/2011 | Karlof | A63C 11/24 280/824 |
| 2011/0187091 A1 * | 8/2011 | Nickaes | A45B 9/04 280/821 |
| 2011/0240078 A1 * | 10/2011 | Lenhart | A45B 9/00 135/75 |
| 2013/0048039 A1 | 2/2013 | Heim | |
| 2013/0264810 A1 * | 10/2013 | Carr | A63C 11/222 280/821 |
| 2014/0209134 A1 * | 7/2014 | Donnadieu | A45B 9/04 135/77 |
| 2014/0216510 A1 * | 8/2014 | Pronzati | A45B 9/00 135/74 |
| 2016/0186791 A1 * | 6/2016 | Lee | B63H 16/04 248/188.5 |
| 2016/0201706 A1 * | 7/2016 | Heim | A45B 9/00 403/110 |

FOREIGN PATENT DOCUMENTS

| | | |
|---|---|---|
| EP | 1105194 | 6/2011 |
| WO | WO9014136 | 11/1990 |
| WO | 9740898 | 11/1997 |

* cited by examiner

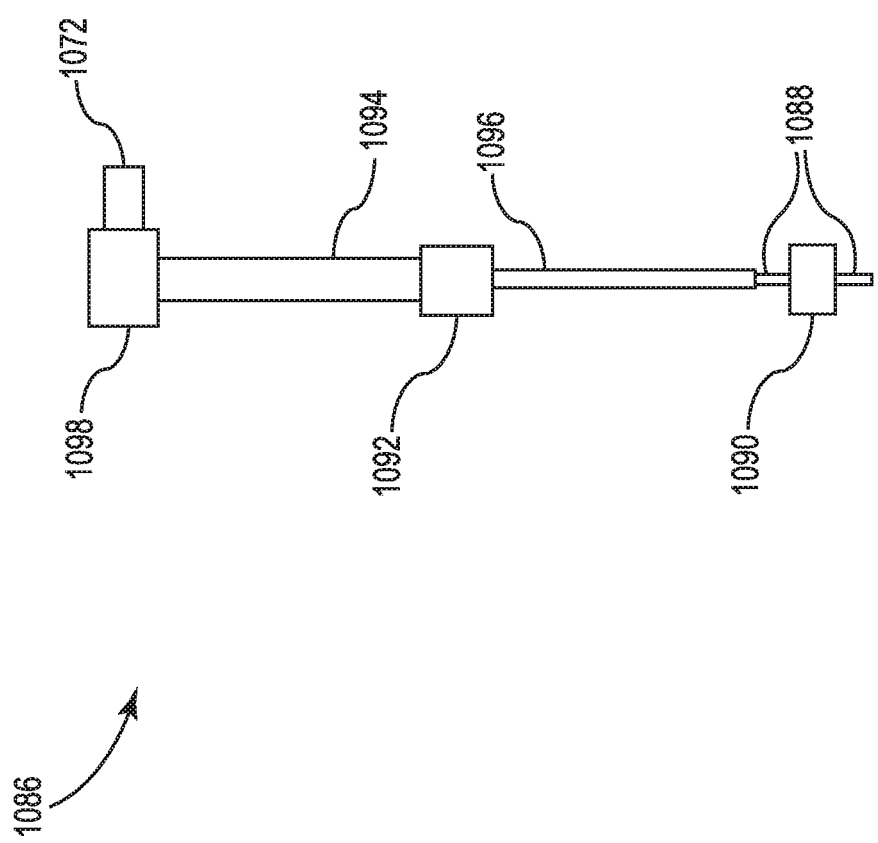

SKI POLE ACCESSORIES

CROSS-REFERENCE TO RELATED APPLICATIONS

This application claims priority to U.S. Provisional Application 62/125,801, filed Feb. 2, 2015, which is incorporated by reference.

TECHNICAL FIELD

The present disclosure relates to ski pole accessories, including releasable ski pole basket systems, ski pole clamp systems, and releasable ski pole strap systems.

BACKGROUND

Ski poles can be an important part of a skier's equipment. Ski poles can help a skier in different aspects of skiing. For example, ski poles can help maintain balance while skiing. Ski poles can assist a skier while turning or braking. Ski poles can assist a skier to propel himself while on a flat or uphill slope. Ski poles can further help a skier who has fallen over by providing a support to assist a skier to stand up.

A ski pole can include different accessories. For example, a ski pole can include a basket near one end of the ski pole, and a grip near an end opposite of the basket. The ski pole can be manufactured from different types of materials, and in different shapes and/or sizes that can vary based on a type of skiing for which the ski pole is designed.

A ski pole basket can be located near an end of the ski pole that contacts a surface on which a skier is skiing. The ski pole basket can help the ski pole grip the surface on which a skier is skiing. Baskets can vary in material type, shape, and/or size based on ski conditions.

Various types of ski poles can be adjustable in length. Adjustable-length ski poles can allow for easy sizing or resizing to a skier's physical characteristics, or for sizing or resizing for different ski activities.

The length of a ski pole can be important for skiing stability. In some examples, a pole that is too short may cause a skier's body to be positioned too far forward during skiing motions. In some examples, a pole that is too long may cause a skier's body to be positioned too far back during skiing motions. Causing a skier to be positioned too far forward or too far back may result in a loss of balance and/or control while skiing. An adjustable-length ski pole can be lengthened or shortened to accommodate a skier's physical characteristics to ensure proper ski form and control while skiing.

A ski pole grip can be a grip at an end of the ski pole opposite of the end near the ski pole basket. The ski pole grip can provide a comfortable area for the skier to grip the ski pole. A ski pole grip can include an attached strap that can be slipped over and/or attached around a skier's wrist. The ski pole strap can prevent the loss of the ski pole in the event the skier falls while skiing. The ski pole strap can assist a skier transfer weight to the pole when skiing with ski poles on flat surfaces and/or when skiing uphill.

BRIEF DESCRIPTION OF THE DRAWINGS

FIG. 10 illustrates a block diagram of a ski pole system, in accordance with one or more embodiments of the disclosure.

DETAILED DESCRIPTION

Figure 1:
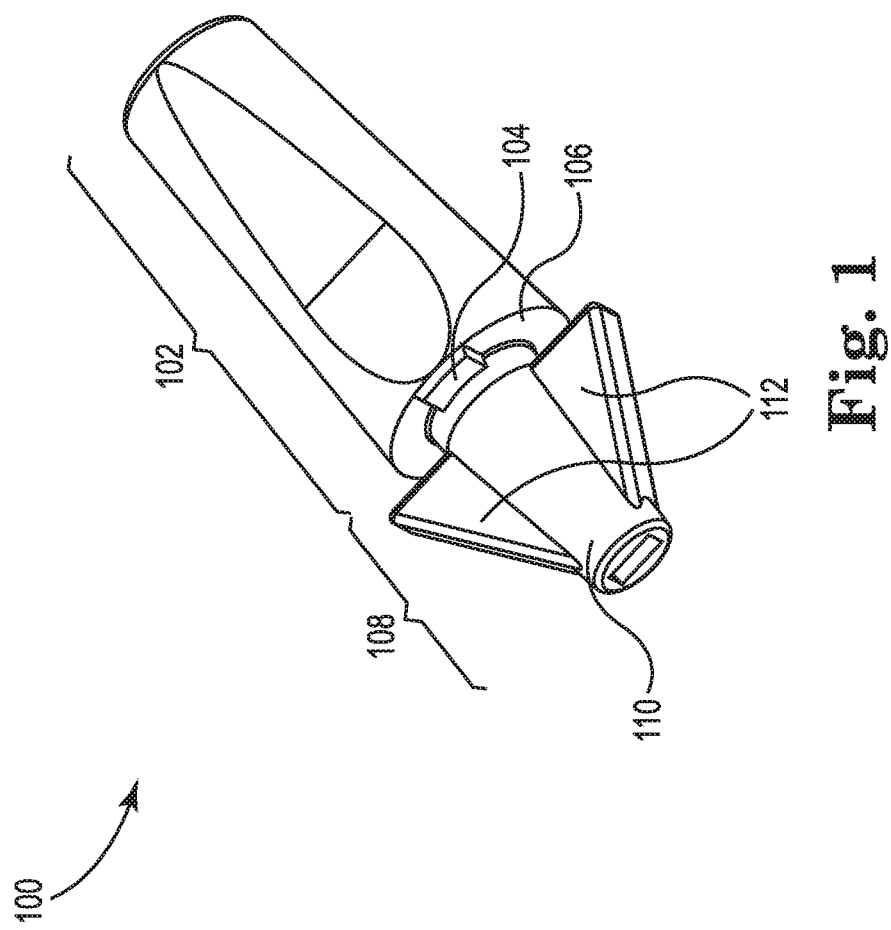
FIG. 1 illustrates a perspective view of a ski pole ferrule, in accordance with one or more embodiments of the disclosure.

Ski pole accessories are described herein. For example, ski pole accessories can include a releasable ski pole basket system, a ski pole clamp system, and/or a releasable ski pole strap system, among others. A ski pole basket system can include a ski pole ferrule and a ski pole basket having a slot therethrough that receives and secures the ski pole ferrule. A ski pole clamp system can include a rubber mold with a first and a second thickness to secure the ski pole clamp to an upper component and a lower component of a ski pole. A releasable ski pole strap system can include a pole mount including a jaw that engages a strap attachment member, where operation of the jaw disengages the strap attachment member from the ski pole mount.

A ski pole basket can be located near an end of the ski pole that contacts a surface on which a skier is skiing. According to some previous approaches, a ski pole basket can be attached to a ski pole by adhesive. However, using adhesive to attach a ski pole basket to a ski pole can suffer from various drawbacks. For example, changing the basket style of the ski pole may include heating an adhesive of a current basket to allow the current basket to be removed. An additional adhesive may be applied to the new ski pole basket to attach the new style basket to the ski pole. Heating an old adhesive to remove an old basket, and using an additional adhesive for a new basket can take time.

According to one or more embodiments of the present disclosure, a releasable ski pole basket system can allow a ski pole basket to be easily added to or removed from a ski pole. For example, a ski pole basket can be quickly added to or removed from the ski pole without the use of extra tools and/or adhesive.

A ski pole can be adjustable in length. An adjustable-length ski pole can include an upper component and a lower component. The two components of the ski pole can have different diameters, allowing the component of the adjustable-length ski pole with the larger diameter to receive the component of the adjustable-length ski pole with the smaller diameter. The length of the adjustable-length ski pole can then be adjusted by sliding the smaller diameter component into or out of the larger diameter component. Once adjusted, the adjustable-length ski pole can be secured using a clamp to apply pressure to the upper component and the lower component.

An inside surface of the clamp can apply pressure to the upper component and the lower component. However, according to some previous approaches, the inside surface of the clamp may not adequately engage both the surface of the larger diameter component and the surface of the smaller diameter component. Further, the material comprising the inside surface of the clamp may not provide enough pressure to prevent the smaller diameter component of the adjustable-length ski pole from moving while the adjustable-length ski pole is in use.

According to one or more embodiments of the present disclosure, a ski pole clamp system can allow a clamp to effectively engage both the larger and the smaller diameter components of the adjustable-length ski pole. For example, the material attached to the inside surface of the ski pole clamp system can include different thicknesses to accommodate the larger and smaller diameter components of the adjustable-length ski pole. Using different thicknesses for the inside surface of the ski pole clamp system that correspond to the different diameter components can allow for the ski pole clamp system to effectively contact the upper component and the lower component of the adjustable-length ski pole. Effective contact with the upper component and the lower component can prevent either component from slipping while the adjustable-length ski pole is in use.

A ski pole can include a grip with an attached strap. The ski pole strap can prevent the ski pole from being lost in the event the skier falls and/or can allow the skier to release his grip on the ski pole without worrying about losing it, as well as assist the skier transfer weight into the ski pole while skiing on flat surfaces and/or when skiing uphill. However, the ski pole strap may prevent a skier from performing certain tasks due to the attachment to the ski pole.

A releasable ski pole strap system can allow a skier to quickly separate his hand from the ski pole. For, a user may want to quickly separate their hand from the ski pole during a fall or to grab a water bottle.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure. As used herein, the singular forms "a", "an", and "the" include singular and plural referents unless the content clearly dictates otherwise.

The figures herein follow a numbering convention in which the first digit or digits correspond to the drawing figure number and the remaining digits identify an element or component in the drawing. Similar elements or components between different figures may be identified by the use of similar digits. For example, 100 may reference element "00" in FIG. 1, and a similar element may be referenced as 200 in FIG. 2. As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

FIG. 1 illustrates a perspective view of a ski pole ferrule 100, in accordance with one or more embodiments of the disclosure. The ski pole ferrule 100 can be part of a ski pole system and/or a releasable ski pole basket system. As shown in FIG. 1, the ski pole ferrule 100 includes an upper portion 102 and a lower portion 108.

The upper portion 102 includes a planar surface 106, which includes two opposing protrusions 104. Although only one of the two opposing protrusions 104 is illustrated in FIG. 1, the other is symmetrical and on the opposite side of the planar surface 106.

The lower portion 108 extends from between the two opposing protrusions 104. The lower portion 108 includes a conical frustum 110 and two opposing triangular members 112 extending from the conical frustum 110. As used herein, a frustum refers to a shape described by a portion of a three-dimensional body that lies between two parallel planes cutting it. For example, conical frustum 110 can be a frustum created by a portion of a cone shape that lies between two parallel planes.

The ski pole ferrule 100 can be manufactured from a material to allow the use of ski pole ferrule 100 in varying conditions. For example, the ski pole ferrule 100 can be a plastic material that can withstand different skiing activities and/or different ski conditions. Although the ski pole ferrule 100 is described as being a plastic material, embodiments are not so limited. For example, the ski pole ferrule 100 can be another material that can withstand different skiing activities and/or different ski conditions.

As used herein, skiing activities can include various types of skiing. For example, skiing activities can include cross-country skiing, Nordic skiing, alpine skiing, and/or roller skiing, among other types of skiing activities. Skiing conditions can include weather conditions (e.g., temperature, precipitation, etc.), snow conditions (e.g., packed snow, snow powder, etc.), terrain conditions (e.g., flat, sloped, moguls, etc.), and/or ground conditions (e.g., snow, concrete, etc.).

As shown in FIG. 1, the upper portion 102 can have a substantially circular cross section along its longitudinal axis. The substantially circular cross section of the upper portion 102 can be useful in racing activities. For example, the circular cross section can be aerodynamically advantageous, allowing a skier to travel faster as a result of reduced aerodynamic drag on the upper portion 102. Although the upper portion 102 is described and shown in FIG. 1 as having a substantially circular cross section, embodiments are not so limited. For example, upper portion 102 can have a square, rectangular, triangular, and ovular or another cross section shape.

The two opposing protrusions 104 can be offset from each other and from each of the two opposing triangular members 112. For example, the two opposing protrusions 104 can be offset 180 degrees from each other and 90 degrees from the two opposing triangular members 112. As an illustrative example, a first of the two opposing protrusions 104 can lie at a twelve o'clock position, a first of the two triangular members 112 can lie at a three o'clock position, a second of the two opposing protrusions 104 can lie at a six o'clock position, and a second of the two triangular members 112 can lie at a nine o'clock position.

The conical frustum 110 can include a first end extending from the planar surface 106 of the upper portion 102 and a second end including an opening to receive a ski pole tip. The opening of the conical frustum 110 can be shaped to receive different types of ski pole tips. For example, a ski pole tip can be a metal tip, plastic tip, or carbide tip, among other types of ski pole tips. Different types of ski pole tips can be utilized for different types of skiing activities and/or skiing conditions. For example, metal tips may be useful for use in alpine skiing on packed snow, while carbide tips may be useful for roller skiing on concrete.

The conical frustum 110 can taper from the planar surface 106 of the upper portion 102. For example, a width at the first end of the conical frustum 110 can be greater than a width at the second end of the conical frustum 110. That is, the width of the conical frustum 110 decreases as the distance from the planar surface 106 increases.

Figure 2:
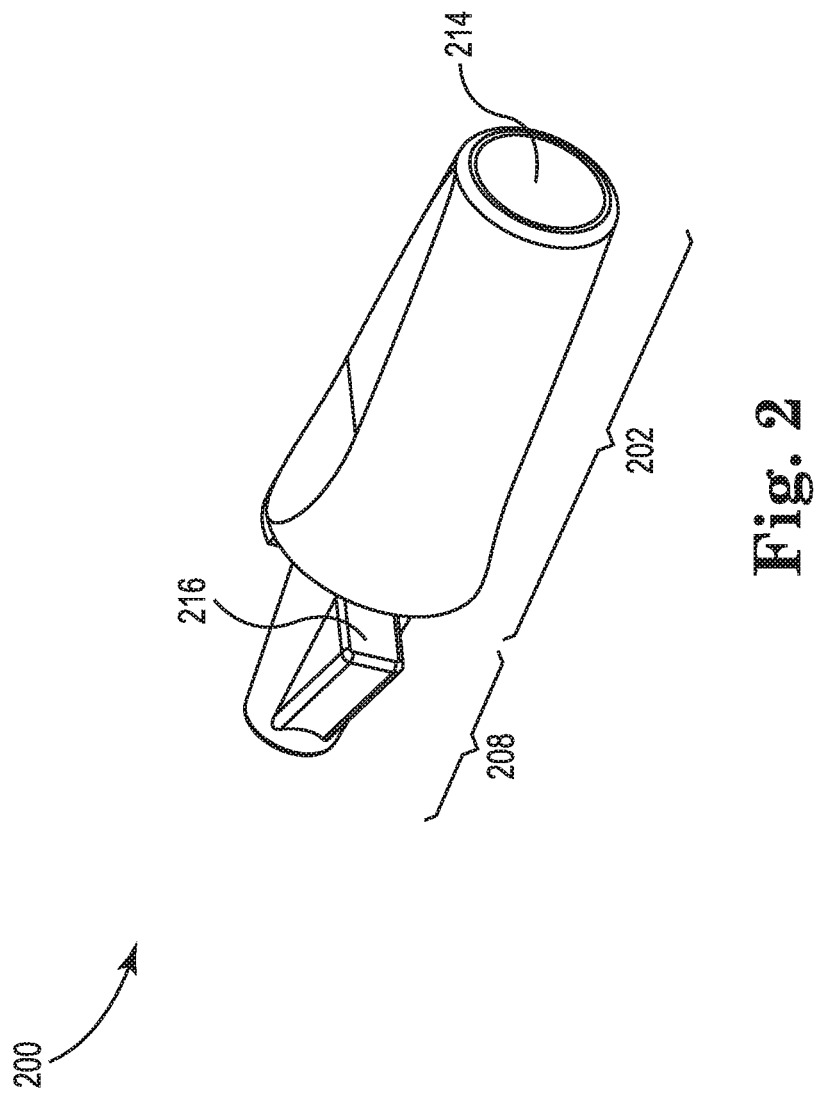
FIG. 2 illustrates a perspective view of a ski pole ferrule, in accordance with one or more embodiments of the disclosure.

FIG. 2 illustrates a perspective view of a ski pole ferrule 200, in accordance with one or more embodiments of the disclosure. The ski pole ferrule 200 is analogous to the ski pole ferrule 100 illustrated in FIG. 1 and includes an upper portion 202 and a lower portion 208. The upper portion 202 includes an opening 214 in a first end of the upper portion 202 configured to receive a ski pole. For example, the opening 214 can receive a ski pole to allow the ski pole ferrule 200 to be attached to the ski pole. The upper portion 202 can include a planar surface (e.g., planar surface 106 illustrated in FIG. 1) at a second end of upper portion 202.

The lower portion 208 includes the conical frustum (e.g., conical frustum 110, previously described in connection with FIG. 1) and the two opposing triangular members extending therefrom (e.g., the two opposing triangular members 112 illustrated in FIG. 1). Each of the two opposing triangular members includes a planar surface 216 parallel to and separated from the planar surface of the conical frustum (e.g., the planar surface 106 illustrated in FIG. 1). That is, a space exists between the two opposing triangular members and the upper portion 202 of ski pole ferrule 200. The space between the two opposing triangular members and the upper portion 202 of ski pole ferrule 200 can allow for a portion of the ski pole basket to lie between the two opposing triangular members and the upper portion 202 of ski pole ferrule 200, as will be further described herein.

In some examples, the ski pole ferrule 200 can be attached to the ski pole by adhesive. For example, adhesive can be placed in the opening 214 and the ski pole can then be received in the opening 214, securing the ski pole ferrule 200 to the ski pole with the adhesive. Although not shown in FIG. 2, an inner surface of the opening 214 can include a plurality of grooves cut into the inner surface of the opening 214. The grooves can allow for an adhesive to more easily attach to the inner surface of opening 214 to the secure ski pole ferrule 200 to the ski pole.

Figure 3:
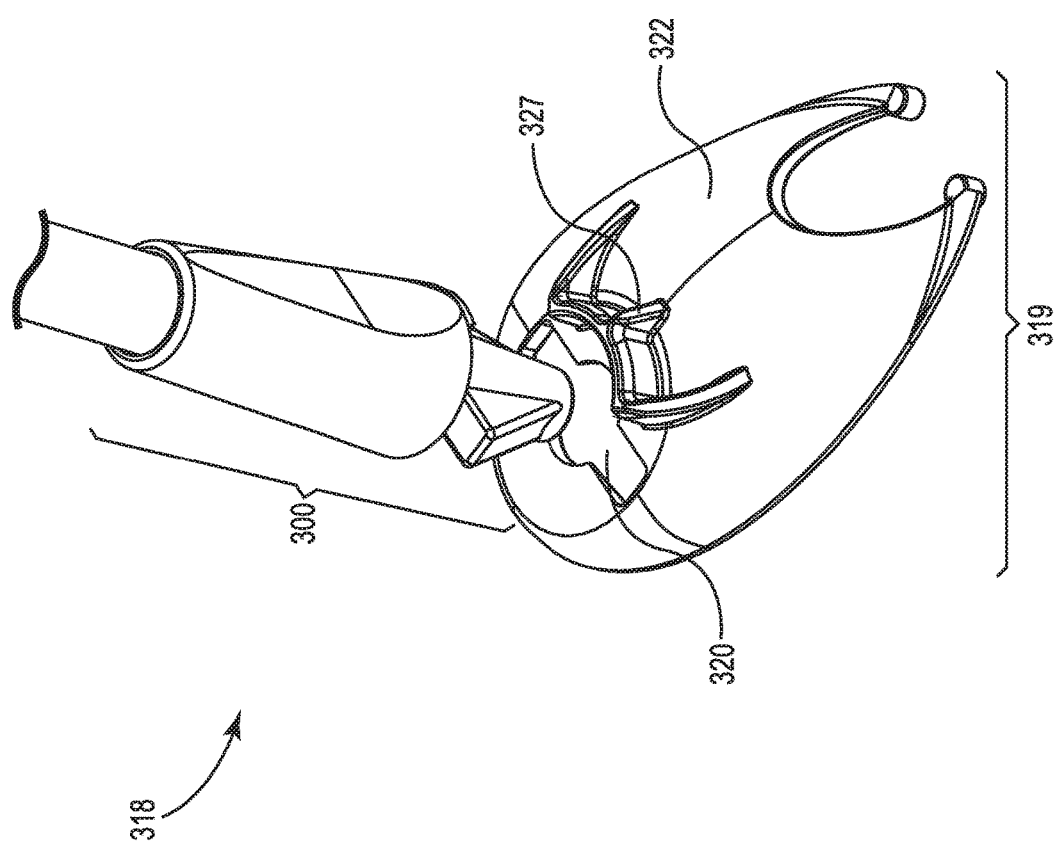
FIG. 3 illustrates a perspective view of a releasable ski pole basket system prior to a ski pole ferrule being received by a ski pole basket, in accordance with one or more embodiments of the disclosure.

FIG. 3 illustrates a perspective view of a releasable ski pole basket system 318 prior to the ski pole ferrule 300 (e.g., ski pole ferrule 100, 200, previously described in connection with FIGS. 1 and 2, respectively) being received by a ski pole basket 319, in accordance with one or more embodiments of the disclosure. As shown in FIG. 3, the ski pole basket 319 can include an upper surface 322, a slot 320, and a protrusion 327.

The ski pole basket 319 can be secured to the ski pole ferrule 300 after the ski pole ferrule 300 is received by the ski pole basket 319. The ski pole ferrule 300 can be received by the ski pole basket 319 through the slot 320, and the ski pole ferrule 300 and/or the ski pole basket 319 can be twisted to secure (e.g., attach) the ski pole basket 319 to the ski pole ferrule 300, as will be further described in connection with FIGS. 4 and 5.

The ski pole basket 319 can be manufactured from a material to allow the use of the ski pole basket 319 in varying types of ski conditions. For example, the ski pole basket 319 can be a plastic material that can withstand different skiing activities and/or different ski conditions to limit a depth a ski pole can sink into snow. Although the ski pole basket 319 is described as being a plastic material, embodiments are not so limited. For example, the ski pole basket 319 can be another material that can withstand different skiing activities and/or different ski conditions.

As shown in FIG. 3, the ski pole basket 319 has a substantially elliptical shape. However, embodiments are not so limited. For example, ski pole basket 319 can include other types of shapes. In some examples, the shape of the ski pole basket 319 can be a differently shaped ellipse. In some examples, the ski pole basket 319 can have a substantially circular shape. A shape of a ski pole basket can have a substantial effect on the performance of the ski pole basket while the ski pole is in use. That is, certain shapes of ski pole baskets may be more beneficial for use in varying types of ski conditions. In an example including a basket for use in powdery snow conditions, a larger basket size can be more beneficial to help prevent the ski pole from sinking into the powdery snow. In an example, including a basket for use in packed snow conditions, a smaller basket can be more beneficial to reduce the weight of the ski pole.

The ski pole basket 319 can include a slot 320 through ski pole basket 319. The slot 320 can be shaped to allow the ski pole ferrule 300 to be received by the ski pole basket 319. For example, the slot 320 can receive the lower portion (e.g., lower portion 108, previously described in connection with FIG. 1) of the ski pole ferrule 300, as will be further described in connection with FIGS. 4 and 5.

The slot 320 can be comprised of a circular portion and two opposing rectangular portions. The circular portion of the slot 320 can be located between the two opposing rectangular portions. The circular portion of the slot 320 can allow for a conical frustum (e.g., conical frustum 110, previously described in connection with FIG. 1) of the ski pole ferrule 300 to be received by the ski pole basket 319. The two opposing rectangular portions of the slot 320 can allow for two opposing triangular members (e.g., two opposing triangular members 112, previously described in connection with FIG. 1) extending from the conical frustum to be received by the ski pole basket 319.

The upper surface 322 of the ski pole basket 319 can include a protrusion 327 proximal to the slot 320. The protrusion 327 can be shaped to mate with the upper portion (e.g., upper portion 102, previously described in connection with FIG. 1) of the ski pole ferrule 300. For example, the protrusion 327 can assist a skier with aligning the ski pole ferrule 300 with the slot 320 of the ski pole basket 319 when the ski pole basket 319 is being connected to the ski pole ferrule 300.

Figure 4:
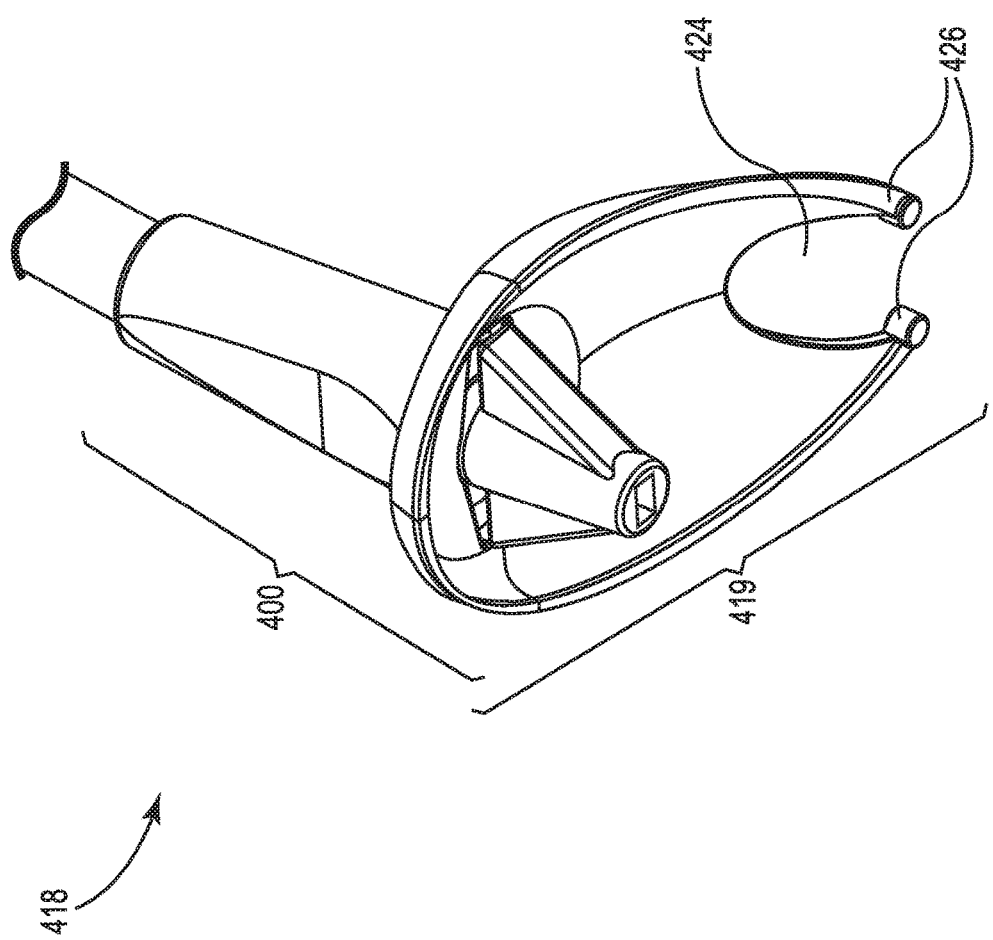
FIG. 4 illustrates a perspective view of a releasable ski pole basket system after a ski pole ferrule has been received by a ski pole basket, in accordance with one or more embodiments of the disclosure.

FIG. 4 illustrates a perspective view of a releasable ski pole basket system 418 after a ski pole ferrule 400 has been received by a ski pole basket 419, in accordance with one or more embodiments of the disclosure. The ski pole basket system 418 is analogous to the ski pole basket system 318 illustrated in FIG. 3. As shown in FIG. 4, the ski pole basket 419 can include a circular notch 424 on the edge of the ski pole basket 419 that includes two opposing tabs 426.

FIG. 4 illustrates the ski pole ferrule 400 being received by the ski pole basket 419 through a slot (e.g., slot 320, previously described in connection with FIG. 3) of the ski pole basket 419. As previously described in connection with FIG. 3, the conical frustum and two opposing triangular members of the ski pole ferrule 400 can be received by a circular portion and two opposing rectangular portions, respectively, of the slot of the ski pole basket 419. Once the ski pole ferrule 400 has been received by the ski pole basket 419, the ski pole ferrule 400 and/or the ski pole basket 419 can be twisted to secure (e.g., attach) the ski pole basket 419 to the ski pole ferrule 400, as will be further described in connection with FIG. 5.

The circular notch 424 can be a notch on an edge of the ski pole basket 419 that can be shaped to receive a different ski pole. For example, a skier may typically have a pair of ski poles for use during skiing activities. When ski poles are not being used by the skier, they may be secured to each other by the circular notch 424. For example, the circular notch 424 of the ski pole basket 419 of a first ski pole can receive a ski pole shaft or component (e.g., an upper or lower ski pole shaft of an adjustable-length ski pole) of a second ski pole. The second ski pole can include a basket with a corresponding circular notch to receive the first ski pole such that the first and the second ski poles are secured to each other.

The circular notch 424 can include two opposing tabs 426 such that when the different ski pole is received, the two opposing tabs 426 secure the different ski pole by an annular snap fit. As used herein, an annular snap fit refers to using hoop strain to hold the different ski pole in place. For example, the portion of the ski pole basket 419 near the circular notch 424 and the two opposing tabs 426 can be more elastic than the other ski pole such that when the other ski pole is forced into the two opposing tabs 426, the two opposing tabs 426 and the ski pole basket 419 can momentarily deform to allow the other ski pole to pass into and be received by the circular notch 424. Although the two opposing tabs 426 are shown as being cylindrical in shape, embodiments are not so limited. For example, the two opposing tabs 426 can be a cube shape, a cuboid shape, a spherical shape, or another shape to secure the different ski pole by an annular snap fit.

Figure 5:
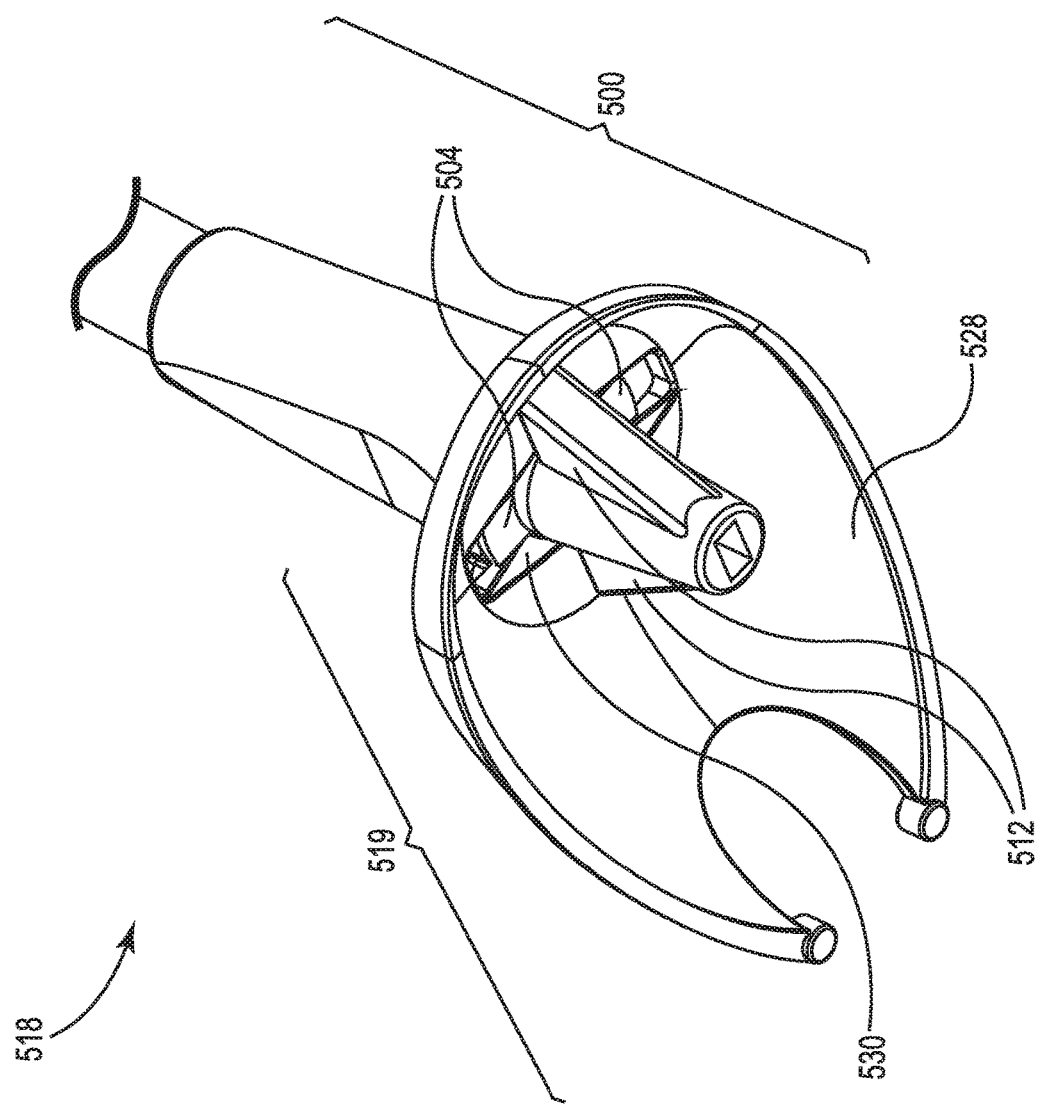
FIG. 5 illustrates a perspective view of a releasable ski pole basket system after the ski pole ferrule has been received by and secured to a ski pole basket, in accordance with one or more embodiments of the disclosure.

FIG. 5 illustrates a perspective view of a releasable ski pole basket system 518 after a ski pole ferrule 500 has been received by and secured to a ski pole basket 519, in accordance with one or more embodiments of the disclosure. The ski pole basket system 518 is analogous to the ski pole basket system 318 illustrated in FIG. 3. The ski pole ferrule 500 can include two opposing protrusions 504 (e.g., two opposing protrusions 104, previously described in connection with FIG. 1) and two opposing triangular members 512 (e.g., two opposing triangular members 112, previously described in connection with FIG. 1). The ski pole basket 519 can include a lower surface 528 and a bevel 530.

FIG. 5 illustrates the ski pole ferrule 500 having been received by ski pole basket 519 through a slot (e.g., slot 320, previously described in connection with FIG. 3) of the ski pole basket 519. As previously described in connection with FIGS. 3 and 4, a conical frustum and two opposing triangular members 512 can be received by the slot of the ski pole basket 519. FIG. 5 illustrates the ski pole ferrule 500 and/or the ski pole basket 519 having been twisted to secure (e.g., attach) the ski pole basket 519 to the ski pole ferrule 500.

The ski pole basket can be secured to the ski pole ferrule 500, for example, by pressing on the ski pole basket 519 and twisting the ski pole ferrule 500 and/or the ski pole basket 519. As shown in FIG. 5, when the ski pole ferrule 500 is received by the ski pole basket 519 and the ski pole basket 519 has been secured to the ski pole ferrule 500, two opposing protrusions 504 extend at least partially through the slot of the ski pole basket 519. The two opposing protrusions 504 can extend at least partially through the slot to keep the ski pole basket 519 from rotating while the ski pole is in use. For example, the ski pole basket 519 is prevented from rotating about the ski pole ferrule 500 by the two opposing protrusions 504 interacting with the sides of the two opposing rectangular portions of the slot.

When the ski pole ferrule 500 is received by the ski pole basket 519 and the ski pole basket 519 has been secured to the ski pole ferrule 500, the planar surface (e.g., planar surface 106, previously described in connection with FIG. 1) of the upper portion (e.g., upper portion 102, previously described in connection with FIG. 1) of the ski pole ferrule 500 is adjacent to an upper surface (e.g., upper surface 322, previously described in connection with FIG. 3) of ski pole basket 519. Additionally, the planar surfaces (e.g., planar surfaces 216, previously described in connection with FIG. 2) of the two opposing triangular members 512 of the ski pole ferrule 500 are adjacent to the lower surface 528 of the ski pole basket 519. The planar surfaces of the two opposing triangular members 512 being adjacent to the lower surface 528 can secure the ski pole ferrule 500 to the ski pole basket 519. For example, the two opposing triangular members 512 can hold the ski pole basket 519 securely against the ski pole ferrule 500.

An edge of the slot of the ski pole basket 519 located on the lower surface 528 of the basket can include a bevel 530. As used herein, a bevel refers to an edge that is not perpendicular or parallel to the faces of an object. For example, the bevel 530 is an edge that is not perpendicular or parallel to the other surfaces of ski pole basket 519. The bevel 530 can assist a skier with twisting the ski pole ferrule 500 and/or the ski pole basket 519 to secure (e.g., attach) the ski pole basket 519 to the ski pole ferrule 500. For example, prior to twisting the ski pole ferrule 500 and/or the ski pole basket 519 to secure the ski pole basket 519 to the ski pole ferrule 500, the two opposing protrusions 504 are adjacent to an upper surface of the ski pole basket 519, preventing the two opposing triangular members 512 from extending all the way through the slot of the ski pole basket 519. That is, the two opposing protrusions 504 prevent the space between the two opposing triangular members 512 and the upper portion of the ski pole ferrule 500 from fully accommodating a thickness of the ski pole basket 519. The bevel 530 can assist the skier by allowing both planar surfaces of the two opposing triangular members 512 to slide under and become adjacent to the lower surface 520 of the ski pole basket 519. Allowing the planar surfaces of the two opposing triangular members 512 to slide under the lower surface 520 can help the skier to begin the twisting motion to secure the ski pole ferrule 500 to the ski pole basket 519.

A releasable ski pole basket system, in accordance with the present disclosure, can allow a ski pole basket to be easily added or removed from a ski pole by using a slot through a ski pole basket to receive a ski pole ferrule. Additionally, a skier can add or remove ski pole baskets without additional tools or adhesive by twisting the ski pole basket and/or ski pole ferrule to secure the ski pole ferrule to the ski pole basket.

Figure 6:
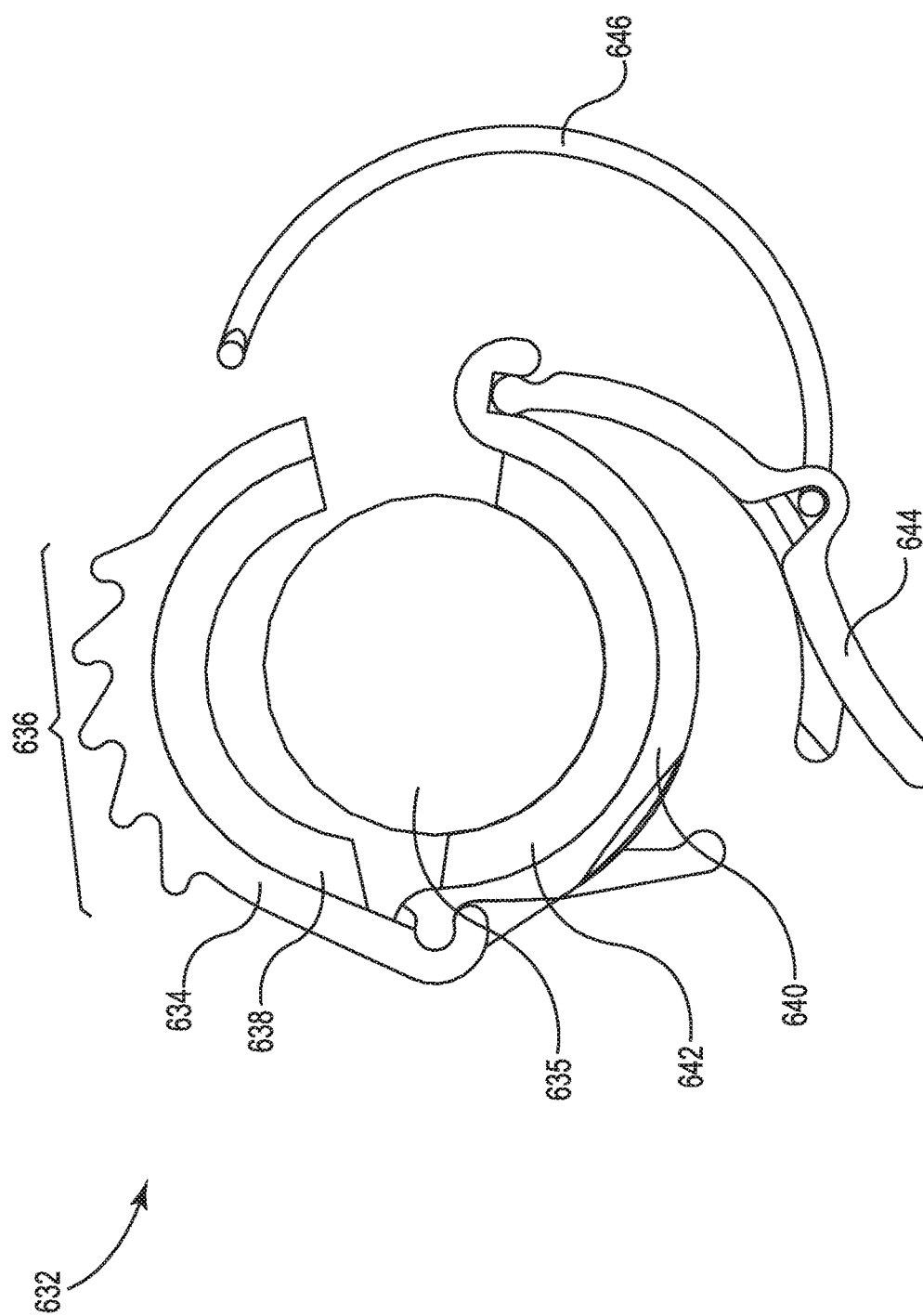
FIG. 6 illustrates a side view of a ski pole clamp system, in accordance with one or more embodiments of the disclosure.

FIG. 6 illustrates a side view of a ski pole clamp system 632, in accordance with one or more embodiments of the disclosure. The ski pole clamp system 632 as illustrated in FIG. 6 is shown in a partially closed configuration after receiving an adjustable-length ski pole 635, but before being fully closed around the adjustable-length ski pole 635 or being buckled.

As shown in FIG. 6, the ski pole clamp system 632 includes a first semi-circular clamp 634, a second semi-circular clamp 640 hinged to the first semi-circular clamp 634, a buckle 644 attached to the second semi-circular clamp 640, and a fastening clip 646 attached to the buckle 644. The first semi-circular clamp 634 includes a plurality of teeth 636 located on an outside surface of the first semi-circular clamp 634. The first semi-circular clamp 634 includes a first rubber mold 638 attached to an inside surface of the first semi-circular clamp 634. The second semi-circular clamp 640 includes a second rubber mold 642 attached to an inside surface of the second semi-circular clamp.

A radius of the first semi-circular clamp 634 can be greater than a radius of an adjustable-length ski pole 635. The adjustable-length ski pole 635 is shown as a cross section in FIG. 6. For example, the radius of the upper component of the adjustable-length ski pole 635 can be fifteen millimeters (mm), and the radius of the first semi-circular clamp 634 can be twenty mm, although embodiments are not limited to the upper component of the adjustable-length ski pole 635 having a radius of fifteen mm and the first semi-circular clamp 634 having a radius of twenty mm.

The first semi-circular clamp 634 can be a contoured shape similar to a shape of the adjustable-length ski pole 635. The contoured shape of the first semi-circular clamp 634 and the radius of the first semi-circular clamp 634 being larger than the radius of the upper component of the adjustable-length ski pole 635 can allow the first semi-circular clamp 634 to wrap around the upper component of the adjustable-length ski pole 635.

The plurality of teeth 636 on the outside surface of the first semi-circular clamp 634 can be protrusions extending from the outside surface of the first semi-circular clamp 634 to engage the fastening clip 646. When the fastening clip 646 is engaged with the plurality of teeth 636 and a force is applied to the buckle 644, the fastening clip 646 causes the first semi-circular clamp 634 and the second semi-circular clamp 640 to cause a compressive force to be applied to the adjustable-length ski pole 635. The fastening clip 646 is configured to engage the plurality of teeth 636 in response to the fastening clip 646 being buckled.

The fastening clip 646 can be shaped in an arc shape such that the fastening clip 646 conforms to the shape of the first semi-circular clamp 634. For example, the arc shape of the fastening clip 646 can be substantially the same semi-circular shape as the first semi-circular clamp 634.

The fastening clip 646 can additionally include a cross bar. The cross bar of the fastening clip 646 can engage the plurality of teeth 636. When the cross bar of the fastening clip 646 is engaged with the plurality of teeth 636, a compressive force can be applied to the buckle 644 to cause a tensile force to be applied to the fastening clip 646. The tensile force on the fastening clip 646 can then cause the compressive force to be applied to the adjustable-length ski pole 635 by the first semi-circular clamp 634 and the second semi-circular clamp 640.

The first rubber mold 638 can be shaped in substantially the same shape as the first semi-circular clamp 634 such that the first rubber mold 638 can be a contoured shape similar to the shape of the adjustable-length ski pole 635. The contoured shape of first rubber mold 638 can allow the first rubber mold 638 to wrap around the upper component of the adjustable-length ski pole 635, as will be further described in connection with FIG. 7.

A radius of the second semi-circular clamp 640 can be greater than a radius of a lower component of the adjustable-length ski pole 635. For example, the radius of the lower component of the adjustable-length ski pole 635 can be thirteen millimeters (mm), and the radius of second semi-circular clamp 640 can be twenty mm, although embodiments are not limited to the lower component of the adjustable-length ski pole 635 having a radius of thirteen mm and the second semi-circular clamp 640 having a radius of twenty mm.

The second semi-circular clamp 640 can be a contoured shape similar to a shape of the adjustable-length ski pole 635. The contoured shape of the second semi-circular clamp 640 and the radius of the second semi-circular clamp 640 being larger than the radius of the lower component of adjustable-length ski pole 635 can allow the second semi-circular clamp 640 to wrap around the lower component of the adjustable-length ski pole 635.

The first semi-circular clamp 634 and/or the second semi-circular clamp 640 can be manufactured from a material to allow the use of the first semi-circular clamp 634 and/or the second semi-circular clamp 640 in varying types of ski conditions. For example, the first semi-circular clamp 634 and/or the second semi-circular clamp 640 can be a plastic material that can withstand different skiing activities and/or different ski conditions. Although the first semi-circular clamp 634 and/or the second semi-circular clamp 640 is described as being a plastic material, embodiments are not so limited. For example, the first semi-circular clamp 634 and/or the second semi-circular clamp 640 can be another material that can withstand different skiing activities and/or different ski conditions.

The second rubber mold 642 can be shaped in substantially the same shape as the second semi-circular clamp 640 such that the second rubber mold 642 can be a contoured shape similar to the shape of the adjustable-length ski pole 635. The contoured shape of the second rubber mold 642 can allow the second rubber mold 642 to wrap around the lower component of the adjustable-length ski pole 635, as will be further described in connection with FIG. 7.

The first rubber mold 638 and/or the second rubber mold 642 can be manufactured from a material to allow the first rubber mold 638 and/or the second rubber mold 642 to grip the lower component of adjustable-length ski pole 635 to prevent the lower component of adjustable-length ski pole from slipping while adjustable-length ski pole 635 is in use. That is, the first rubber mold 638 and/or the second rubber mold 642 can be a material that includes a coefficient of friction such that forces experienced by the first rubber mold 638 and/or the second rubber mold 642 during use of adjustable-length ski pole 635 do not cause the lower component of adjustable-length ski pole 635 to change position relative to the first rubber mold 638 and/or the second rubber mold 642.

In some examples, the first rubber mold 638 and/or the second rubber mold 642 can be a material such as natural rubber. For example, natural rubber can include polymers of isoprene, minor impurities of other organic compounds, and water. In some examples, the first rubber mold 638 and/or the second rubber mold 642 can be a material such as synthetic rubber. For example, synthetic rubber can include a plurality of artificial elastomers. Although the first rubber mold 638 and/or the second rubber mold 642 is described as being a natural rubber or a synthetic rubber, embodiments are not so limited. For example, the first rubber mold 638 and/or the second rubber mold 642 can be another viscoelastic material to prevent a lower component of an adjustable-length ski pole 635 from slipping while adjustable-length ski pole 635 is in use.

The second semi-circular clamp 640 can be hinged to the first semi-circular clamp 634 such that the first semi-circular clamp 634 and the second semi-circular clamp 640 can rotate relative to each other. For example, as shown in FIG. 6, the first semi-circular clamp 634 can be hinged to the second semi-circular clamp 640 at an end of both first the semi-circular clamp 634 and the second semi-circular clamp 640 to allow the first semi-circular clamp 634 and the second semi-circular clamp 640 to rotate away from each other to receive the adjustable-length ski pole 635 therebetween.

Figure 7:
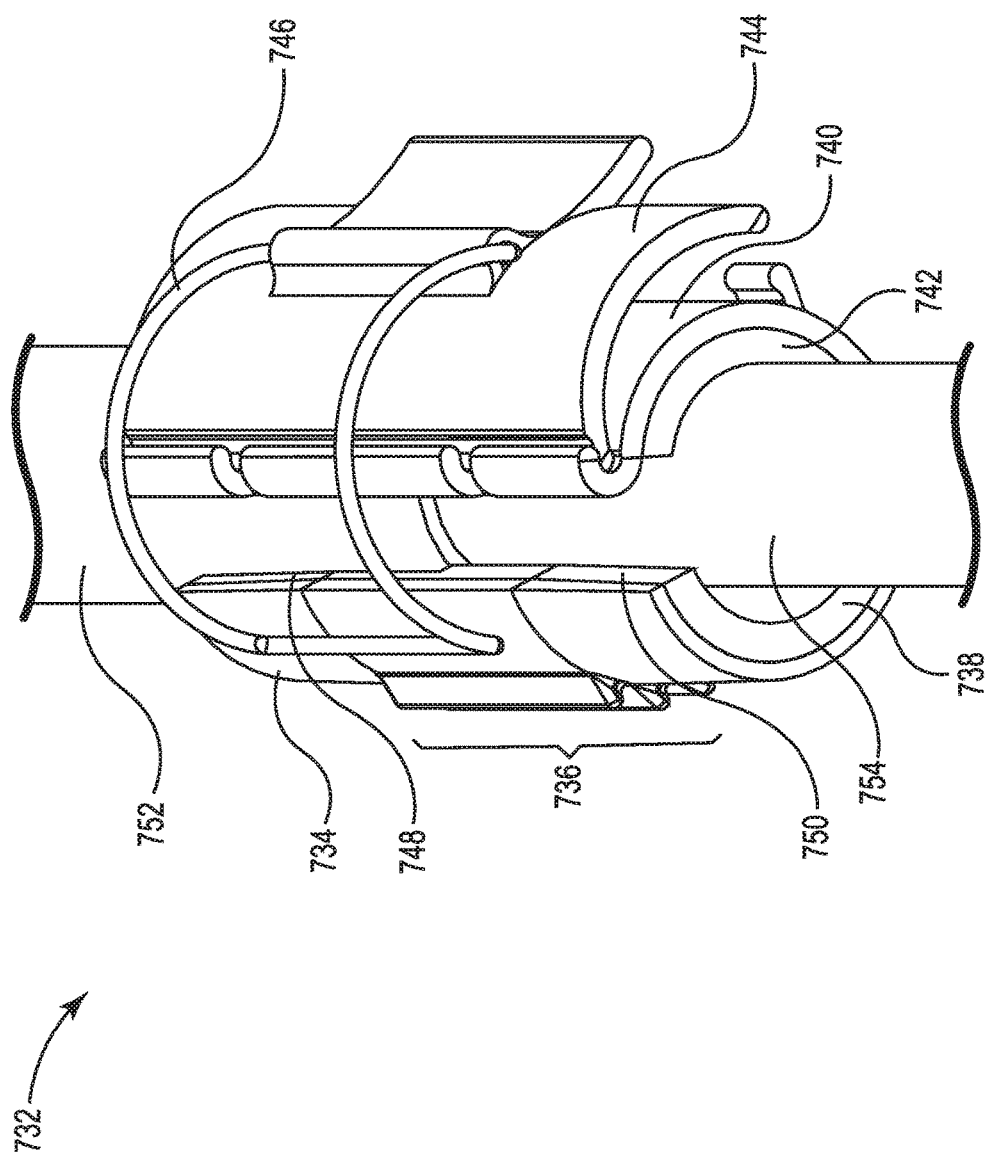
FIG. 7 illustrates a perspective view of a ski pole clamp system, in accordance with one or more embodiments of the disclosure.

FIG. 7 illustrates a perspective view of a ski pole clamp system 732, in accordance with one or more embodiments of the disclosure. The ski pole clamp system 732 is analogous to the ski pole clamp system 632 illustrated in FIG. 6. The ski pole clamp system 732 as illustrated in FIG. 7 is shown in a mostly closed configuration after receiving an adjustable-length ski pole, after being mostly closed around the adjustable-length ski pole, but before being fully closed around the adjustable-length ski pole 635 (as illustrated by the gap between the first rubber mold 738 and the second rubber mold 742) and before being buckled (as illustrated by the buckle 744 being in an open or up configuration relative to the second semi-circular clamp 740).

As shown in FIG. 7, the ski pole clamp system 732 includes a first semi-circular clamp 734, a second semi-circular clamp 740, a buckle 744, and a fastening clip 746. The first semi-circular clamp 734 includes a plurality of teeth 736. A first rubber mold 738 is attached to an inside surface of the first semi-circular clamp 734. A second rubber mold 742 is attached to an inside surface of the second semi-circular clamp 740.

The first rubber mold 738 can have a first section 748 with a first thickness and a second section 750 with a second thickness. For example, the first section 748 can be a top section of the first semi-circular clamp 734 and the second section 750 can be a bottom section of the first semi-circular clamp 734. The first thickness of the first section 748 can correspond to an upper component 752 of an adjustable-length ski pole and the second thickness of the second section 750 can correspond to a lower component 754 of the adjustable-length ski pole.

The second rubber mold 742 can have a first section with the first thickness and a second section with the second thickness. The first section and the second section of the second rubber mold 742 are not specifically illustrated in FIG. 7 due to perspective. For example, the first section can be a top section of the second semi-circular clamp 740 and the second section can be a bottom section of the second semi-circular clamp 740. The first thickness of the first section can correspond to the upper component 752 of an adjustable-length ski pole and the second thickness of the second section can correspond to the lower component 754 of the adjustable-length ski pole.

The upper component 752 of the adjustable-length ski pole can include a cross section that is larger than a cross section of the lower component 754 of the adjustable-length ski pole. That is, the upper component 752 of the adjustable-length ski pole can have a diameter (e.g., fifteen mm) that is larger than a lower component 754 diameter (e.g., thirteen mm) of the adjustable-length ski pole to allow the lower component 754 to be received by the upper component 752 at a junction. In this way, the length of the adjustable-length ski pole can be adjusted by moving the lower component 754 or the upper component 752 relative to each other.

Although the upper component 752 of the adjustable-length ski pole is shown in FIG. 7 and described as having a cross-section that is larger than the cross section of the lower component 754 of the adjustable-length ski pole, embodiments are not so limited. For example, the lower component 754 can have a cross-section that is larger than the cross section of the upper component 752 of the adjustable-length ski pole.

The first thickness of the first sections of both the first rubber mold 738 and the second rubber mold 742 can be less than the second thickness of the second sections of both the first rubber mold 738 and the second rubber mold 742. The first sections of both the first rubber mold 738 and the second rubber mold 742 can have a first thickness to allow the first sections to cause a compressive force to be applied to the upper component 752 of the adjustable-length ski pole. Correspondingly, the second sections of both the first rubber mold 738 and the second rubber mold 742 can have a second thickness to allow the second sections to cause a compressive force to be applied to the lower component 754 of the adjustable-length ski pole simultaneously with and in proportion to the compressive force applied to the upper component 752 of the adjustable length ski pole.

As previously described in connection with FIG. 6, the ski pole clamp system 732 can include the buckle 744 attached to the second semi-circular clamp 740 and can include the fastening clip 746 attached to the buckle 744. The fastening clip 746 is configured to engage the plurality of teeth of the first semi-circular clamp 734 such that when the fastening clip 746 is buckled, the first semi-circular clamp 734 and the second semi-circular clamp 740 cause a compressive force to be applied to the adjustable-length ski pole. When the fastening clip 746 is buckled, the first section 748 of the first rubber mold 738 is located opposite to and in contact with the first section of the second rubber mold 742 to form a first portion of a collar. Additionally, the second section 750 of the first rubber mold 738 is located opposite to and in contact with the second section of the second rubber mold 742 to form a second portion of the collar.

The first portion of the collar is configured to be in contact with the upper component 752 of the adjustable-length ski pole when the fastening clip 746 is buckled. For example, when the fastening clip 746 is buckled, the first portion of the collar can cause a compressive force to be applied to the upper component 752 such that the upper component 752 does not change position relative to the lower component 754 while the adjustable-length ski pole is in use.

The second portion of the collar is configured to be in contact with the lower component 754 of the adjustable-length ski pole when the fastening clip 746 is buckled. For example, when the fastening clip 746 is buckled, the second portion of the collar can cause a compressive force to be applied to the lower component 754 such that the lower component 754 does not change position relative to the upper component 752 while the adjustable-length ski pole is in use.

The first and the second portion of the collar are configured to be in contact with the upper component 752 and the lower component 754 of the adjustable-length ski pole, respectively, at a junction therebetween. The junction can be the area where the lower component 754 is received by the upper component 752. For example, the first and the second portion of the collar can cause compressive force to be applied to the upper component 752 and the lower component 754 of the adjustable-length ski pole at the junction to keep the upper component 752 and the lower component 754 of the adjustable-length ski pole from changing positions relative to each other.

A ski pole clamp system, in accordance with the disclosure, can prevent components of an adjustable-length ski pole from moving while the ski pole is in use. The length of a ski pole can be important to a skier. In some examples, the length of a ski pole can determine the positioning of a skier's body during skiing activities. Therefore, adjustment of the length of a ski pole can ensure proper form while skiing. By utilizing different thicknesses for the rubber molds of the semi-circular clamps, the clamp system can better distribute compressive forces onto the components of the ski pole, resulting in a more secure clamping system for the adjustable-length ski pole.

In some examples such as racing events, the length of a ski pole may be different based on a type of racing event. Skier's competing in racing events previously would need to purchase two sets of ski poles for different racing events. The ski pole clamp system can additionally allow for quick adjustments to a single set of ski poles, eliminating the need for two sets of ski poles while providing an easy and quick way to adjust the length of the adjustable-length ski pole.

Figure 8:
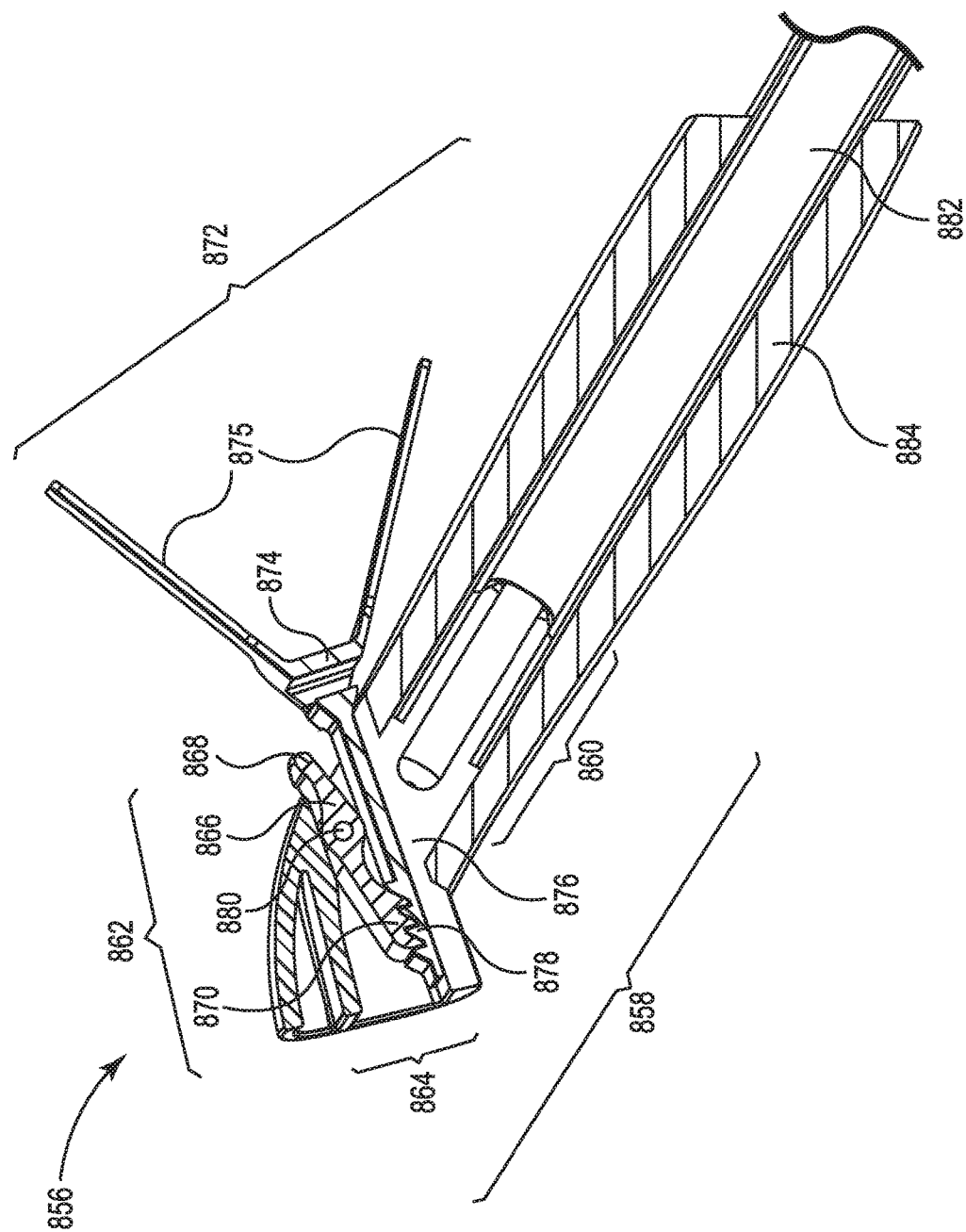
FIG. 8 illustrates a cross-sectional view of a releasable ski pole strap system, in accordance with one or more embodiments of the disclosure.

FIG. 8 illustrates a cross-sectional view of a releasable ski pole strap system 856, in accordance with one or more embodiments of the disclosure. As shown in FIG. 8, the releasable ski pole strap system 856 can include a pole mount 858 and a strap attachment member 872. Also illustrated in FIG. 8 are a ski pole 882, and a ski pole grip 884. The pole mount 858 can include a first portion 860 and a second portion 862. The first portion 860 can be configured to be inserted into the ski pole 882, which is inserted into the ski pole grip 884. That is, the first portion 860 can include an outer diameter that is less than an inner diameter of the ski pole 882 such that the ski pole 882 can receive the first portion 860. In at least one embodiment, the first portion 860 can have a length of fifty mm. However, embodiments are not limited to a length of fifty mm. For example, the length of the first portion 860 can be more than fifty mm or less than fifty mm. Although not shown in FIG. 8, an outer surface of the first portion 860 can include a plurality of grooves therein. The grooves can allow for adhesive to more easily attach to the outer surface of the first portion 860 to secure the pole mount 858 to the ski pole 882.

The ski pole grip 884 can be a material encompassing an upper portion of the ski pole 882. The ski pole grip 884 can allow for a skier to easily and comfortably grip the ski pole 882 and the strap attachment member 872 while using the ski pole 882

The second portion 862 can be attached to the first portion 860. The second portion 862 can include an opening 864 through the second portion 862 and a jaw 866 pivotally attached within opening 864. The jaw can include a lever 868 extending from the pole mount 858 and a plurality of jaw teeth 870 located within the opening. The jaw 866 can be a rigid member that pivots about a fixed hinge. The jaw 866 can be located substantially within the opening 864 (e.g., except for the lever 868).

The opening 864 through the second portion 862 can be shaped as a pyramidal frustum. A pyramidal frustum can be a portion of a three-dimensional body having a pyramid shape that lies between two parallel planes. For example, the opening 864 can be shaped as a pyramidal frustum with four sides between two parallel planes, such as a square pyramidal frustum as opposed to a triangular pyramidal frustum, which would have three sides. The pyramidal frustum shape of the opening 864 can taper from a first end of the opening 864 located near the lever 868 to a second end of the opening 864 located near a plurality of tongue teeth 878 and a plurality of jaw teeth 870. The lever 868 of the jaw 866 can extend from the opening 864 of the pole mount 858. The plurality of jaw teeth 870 can be protrusions extending from a surface of jaw 866, where the plurality of jaw teeth 870 can engage the plurality of tongue teeth 878, as will be further described herein.

The jaw 866 can be pivotally attached about a pin 880. The pin 880 can be substantially perpendicular to two sides of the opening 864 and span the opening 864. For example, the pin 880 can horizontally span the opening 864. The pin 880 can allow the jaw 866 to pivot when a force is applied to the lever 868. For example, a skier may apply force to the lever 868 to cause the jaw 866 to pivot about the pin 880 to cause the plurality of jaw teeth 870 to disengage from the plurality of tongue teeth 878, as will be further described herein.

The pole mount 858 can be manufactured from a material to allow the use of the pole mount 858 in varying types of ski conditions. For example, the pole mount 858 can be a plastic material that can withstand different skiing activities and/or different ski conditions. Although pole mount 858 is described as being a plastic material, embodiments are not so limited. For example, pole mount 858 can be another material that can withstand different skiing activities and/or different ski conditions. In at least one embodiment, the jaw 866 can be manufactured from a material different than that of the first portion 860 and/or the second portion 862 of the pole mount 858, however embodiments are not so limited as the jaw 866 can be manufactured from the same material.

The strap attachment member 872 can include a channel 874, a tongue 876, and two projecting members 875. The strap attachment member 872 can include the channel 874 through the strap attachment member 872. The channel 874 can be configured to receive a strap. As used herein, a strap can refer to a wrist strap to secure the ski pole 882 to a skier's wrist, such as to prevent the ski pole 882 from being lost during a fall. The strap can be a flexible nylon that can be attached around strap attachment member 872, although embodiments are not limited to flexible nylon. Although not specifically illustrated, the strap can pass through the channel 874, go over each of the two projecting members 875, and form a loop, for example.

The strap attachment member 872 can include the tongue 876, which is configured to be positioned within the opening 864 of the pole mount 858. The strap attachment member can include the two projecting members 875 attached to the tongue 876 outside of the opening 864 of the pole mount 858.

The tongue 876 can include the plurality of tongue teeth 878. The plurality of tongue teeth 870 can be protrusions extending from a surface of the tongue 876. The plurality of tongue teeth 878 and the plurality of jaw teeth 870 can be shaped such that a skier can slide the strap attachment member 872 into the opening 864 of the pole mount 858. The plurality of tongue teeth 878 can be configured to engage the plurality of jaw teeth 870 such that when engaged, the strap attachment member 872 is secured within pole mount 858. The skier can slip or attach the strap around the skier's wrist to prevent the loss of the ski pole 882 while the strap attachment member 872 is secured within the pole mount 858.

Operation of the lever 868 outside of the pole mount 858 can disengage the plurality of tongue teeth 878 from the plurality of jaw teeth 870 such that the strap attachment member 872 is removable from the pole mount 858. For example, a skier may want to separate his hand from the ski pole 882 without removing the strap from around his wrist. The skier may operate (e.g., apply a force) to the lever 868 to cause the jaw 866 to pivot about the pin 880, which causes the plurality of jaw teeth 870 to disengage the plurality of tongue teeth 878. Disengaging the plurality of jaw teeth 870 from the plurality of tongue teeth 878 can allow the strap attachment member 872 to be slid out of the opening 864 of the pole mount 858.

The strap attachment member 872 can be manufactured from a material to allow the use of the strap attachment member 872 in varying types of ski conditions. For example, the strap attachment member 872 can be a plastic material that can withstand different skiing activities and/or different ski conditions. Although the strap attachment member 872 is described as being a plastic material, embodiments are not so limited. For example, the strap attachment member 872 can be another material that can withstand different skiing activities and/or different ski conditions.

Figure 9:
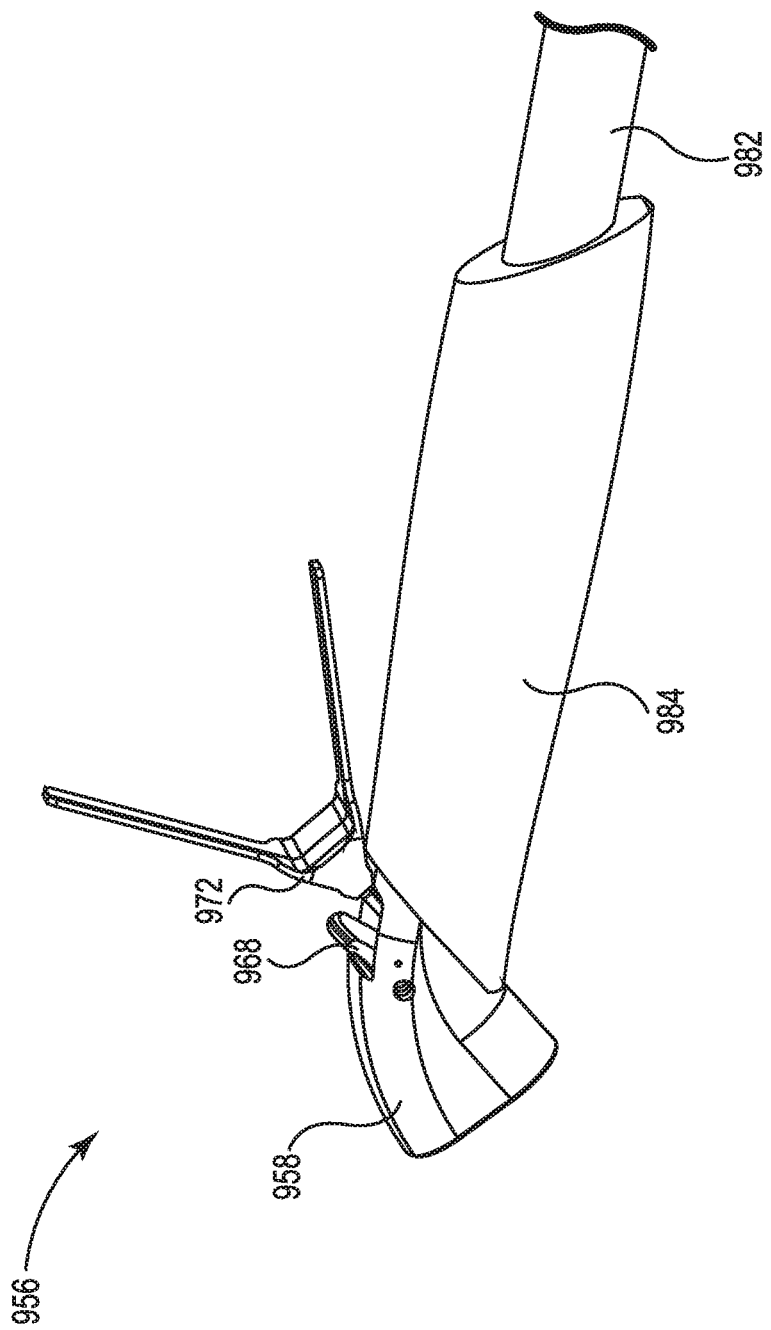
FIG. 9 illustrates a perspective view of a releasable ski pole strap system, in accordance with one or more embodiments of the disclosure.

FIG. 9 illustrates a perspective view of a releasable ski pole strap system 956, in accordance with one or more embodiments of the disclosure. The releasable ski pole strap system 956 is analogous to the releasable ski pole strap system 856 illustrated in FIG. 8. Shown in FIG. 9 is the releasable ski pole strap system 956 that can include the pole mount 958, the lever 968, the strap attachment member 972, the ski pole grip 984, and the ski pole 982.

As shown in FIG. 9, the lever 968 can extend from the pole mount 958. For example, the lever 968 can extend from an opening (e.g., opening 864, previously described in connection with FIG. 8) of the pole mount 958 to allow a skier to operate (e.g., apply a force) to the lever 968 such that the strap attachment member 972 is removable from the pole mount 958.

A releasable ski pole strap system, in accordance with the disclosure, can allow a user of a ski pole to easily release a ski pole without having to remove a strap from around his wrist or be secured to a ski pole without having to place a strap over his wrist (more than once). Quickly being secured to or releasing a ski pole can allow a user of the ski pole to perform other actions with his hand(s) that would otherwise be more difficult while being attached to the ski pole.

FIG. 10 illustrates a block diagram of a ski pole system 1086, in accordance with one or more embodiments of the disclosure. As shown in FIG. 10, the ski pole system 1086 can include a ski pole ferrule 1088 (e.g., ski pole ferrule 100, 200, 300, 400, and 500, previously described in connection with FIGS. 1-5, respectively), a ski pole basket 1090 (e.g., ski pole basket 319, 419, and 519, previously described in connection with FIGS. 3-5, respectively), a ski pole clamp 1092 (e.g., ski pole clamp 632 and 732, previously described in connection with FIGS. 6 and 7, respectively), a pole mount 1098 (e.g., pole mount 858 and 958, previously described in connection with FIGS. 8 and 9, respectively), and a strap attachment member 1072 (e.g., strap attachment member 872 and 972, previously described in connection with FIGS. 8 and 9, respectively). Also illustrated in FIG. 10 is an upper component 1094 of an adjustable-length ski pole (e.g., upper component 752, previously described in connection with FIG. 7), a lower component 1096 (e.g., lower component 754, previously described in connection with FIG. 7) of the adjustable-length ski pole.

The ski pole ferrule 1088 can include two opposing triangular members (e.g., two opposing triangular members 112 and 512, previously described in connection with FIGS. 1 and 5, respectively) extending therefrom and an opening that receives the lower component 1096 of the adjustable-length ski pole.

The ski pole basket 1090 can include a slot (e.g., slot 320, previously described in connection with FIG. 3) therethrough that receives and secures the ski pole ferrule 1088.

The ski pole clamp 1092 can include a rubber mold attached to an inside surface of the ski pole clamp 1092. The rubber mold includes a first section with a first thickness and a second section with a second thickness, such that when the ski pole clamp 1092 is closed, the first and the second sections of the rubber mold secure the ski pole clamp 1092 to the upper component 1094 and the lower component 1096, respectively.

The pole mount 1098 can receive the upper component 1094. The pole mount 1098 can include a jaw pivotally attached in an opening of the pole mount 1098.

The strap attachment member 1072 can include a tongue secured within the opening of the pole mount 1098 and two projecting members attached to the tongue outside of the opening. The tongue can be secured within the opening of the pole mount 1098 by engagement with the jaw. The jaw can be operated to disengage the tongue from the jaw such that the strap attachment member 1072 is removable from the pole mount 1098.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A releasable pole basket system, comprising:
   a pole ferrule, including:
      an upper portion including:
         an opening in a first end of the upper portion configured to receive a pole; and
         a planar surface at a second end of the upper portion, wherein the planar surface includes two opposing protrusions; and
      a lower portion extending from between the two opposing protrusions, the lower portion including:
         a conical frustum; and two opposing triangular members extending from the conical frustum, each including a planar surface parallel to and separated from the planar surface of the upper portion; and
a pole basket having a slot therethrough configured to receive the pole ferrule such that when the pole ferrule is received:
the two opposing protrusions extend at least partially through the slot;
the planar surface of the upper portion is adjacent to an upper surface of the basket; and
the planar surfaces of the two opposing triangular members are adjacent to a lower surface of the basket.

2. The system of claim 1, wherein the slot comprises a circular portion and two opposing rectangular portions.

3. The system of claim 1, wherein an edge of the slot located on the lower surface of the basket includes a bevel.

4. The system of claim 1, wherein the two opposing protrusions are offset ninety degrees from the two opposing triangular members.

5. The system of claim 1, wherein the conical frustum tapers from the planar surface of the upper portion.

6. The system of claim 1, wherein the conical frustum includes:
a first end extending from the planar surface of the upper portion; and
a second end including an opening configured to receive a pole tip.

7. The system of claim 1, wherein the pole basket includes a circular notch on an edge of the pole basket, wherein the circular notch is shaped to receive a different pole.

8. The system of claim 7, wherein the circular notch includes two opposing tabs such that when the different pole is received, the two opposing tabs secure the different pole by an annular snap fit.

9. The system of claim 1, wherein the upper surface includes a protrusion proximal to the slot shaped to mate with the upper portion of the pole ferrule.

10. A pole clamp system, comprising:
a first semi-circular clamp, including:
a plurality of teeth located on an outside surface of the first semi-circular clamp; and
a first rubber mold attached to an inside surface of the first semi-circular clamp, the first rubber mold having a first section with a first thickness and a second section with a second thickness;
a second semi-circular clamp hinged to the first semi-circular clamp, including a second rubber mold attached to an inside surface of the second semi-circular clamp, the second rubber mold having a first section with the first thickness and a second section with the second thickness;
a buckle attached to the second semi-circular clamp; and
a fastening clip attached to the buckle, wherein the fastening clip is configured to engage the plurality of teeth, such that when the fastening clip is buckled:
the first section of the first rubber mold is located opposite to and in contact with the first section of the second rubber mold to form a first portion of a collar; and
the second section of the first rubber mold is located opposite to and in contact with the second section of the second rubber mold to form a second portion of the collar.

11. The system of claim 10, wherein the first thickness is less than the second thickness.

12. The system of claim 10, wherein the first portion of the collar is configured to be in contact with an upper component of an adjustable-length pole when the fastening clip is buckled.

13. The system of claim 10, wherein the second portion of the collar is configured to be in contact with a lower component of the adjustable-length pole when the fastening clip is buckled.

14. The system of claim 10, wherein the first and the second portion of the collar are configured to be in contact with an upper component and a lower component of the adjustable-length pole, respectively, at a junction therebetween.

15. The system of claim 10, wherein the upper component of the adjustable-length pole includes a cross section that is larger than a cross section of the lower component of the adjustable-length pole.

16. The system of claim 10, wherein the fastening clip is configured to engage the plurality of teeth in response to the fastening clip being buckled.

17. A releasable pole strap system, comprising:
a pole mount, including:
a first portion configured to be inserted into a pole; and
a second portion attached to the first portion, wherein the second portion includes:
an opening through the second portion; and
a jaw pivotally attached within the opening, the jaw including a lever extending from the pole mount and a plurality of jaw teeth located in the opening; and
a strap attachment member, including:
a channel through the strap attachment member configured to receive a strap;
a tongue configured to be positioned within the opening; and
two projecting members attached to the tongue and located outside of the opening;
wherein the tongue includes a plurality of tongue teeth configured to engage the plurality of jaw teeth such that when engaged, the strap attachment member is secured within the pole mount; and
wherein operation of the lever outside of the pole mount disengages the plurality of tongue teeth from the plurality of jaw teeth such that the strap attachment member is removable from the pole mount.

18. The system of claim 17, wherein the opening through the second portion is shaped as a pyramidal frustum.

19. The system of claim 17, wherein the jaw is pivotally attached about a pin, wherein the pin is substantially perpendicular to two sides of the opening and spans the opening.

20. A pole system, comprising:
a pole ferrule including two opposing members extending therefrom and an opening that receives a lower component of an adjustable-length pole;
a pole basket having a slot therethrough that receives and secures the pole ferrule;
a pole clamp including a rubber mold attached to an inside surface of the pole clamp,
wherein the rubber mold includes a first section with a first thickness and a second section with a second thickness, such that when the pole clamp is closed, the first section of the rubber mold contacts an upper component of the adjustable-length pole and the second section of the rubber mold contacts the lower component of the adjustable-length pole to secure the pole clamp to the upper component of the adjustable-length pole and the lower component respectively; and a pole mount that receives the upper component and includes a jaw pivotally attached in an opening of the pole mount; and a strap attachment member including a tongue secured within the opening by engagement with the jaw and two projecting members attached to the tongue outside of the opening;

wherein operation of the jaw disengages the tongue from the jaw such that the strap attachment member is removable from the pole mount.

* * * * *